INVENTOR:
WALTER H. SILVER
ATTORNEYS.

Aug. 31, 1943.   W. H. SILVER   2,328,173
GAUGING AND LIFTING MECHANISM FOR IMPLEMENTS
Filed Sept. 28, 1939   3 Sheets-Sheet 3

*INVENTOR:*
WALTER H. SILVER
*ATTORNEYS.*

Patented Aug. 31, 1943

2,328,173

UNITED STATES PATENT OFFICE 2,328,173

GAUGING AND LIFTING MECHANISM FOR IMPLEMENTS

Walter H. Silver, Moline, Ill., assignor to Deere & Company, Moline, Ill., a corporation of Illinois Application September 28, 1939, Serial No. 296,925

24 Claims. (Cl. 97—47)

The present invention relates generally to agricultural implements and more particularly to plows, listers and other soil working implements which are provided with a tool or tools the depth of operation of which is governed or controlled by ground engaging gauge means, such as gauge wheels or the like.

The object and general nature of the present invention is the provision of a simplified mechanism embodying a single member operatively connected with the gauge means and the supporting frame so that a part of the movement of said member serves to adjust the position of the gauge wheels, thereby determining depth of penetration, while another movement of the same member serves to lift both the tool and the gauge means out of ground engaging position. It is a feature of the present invention to provide means operative through one range of movement to adjust the depth of operation and operative through another range of movement to raise both the tool means and the gauge means into transport position. More specifically, it is a feature of this invention to provide means first reacting against the gauge wheel for raising the tool beam and thereafter reacting against the supporting means, which may be a tractor or the like, to raise both the tool beam and the gauge means, and so constructed and arranged that the gauge means is then preventing from moving any substantial amount relative to the tool beam.

A further object is to dispose the gauge means slightly lower than the tool means when the latter is raised so as to protect the points from accidental contact with the ground.

An additional feature of the present invention in this connection is the provision of means in the nature of a toggle linkage between the tool beam and the gauge wheel and arranged so that movement of the toggle linkage into a substantially dead-center relationship serves to adjust the position of the tool beam relative to the gauge wheel, further movement of the linkage occasioning little additional movement of the gauge wheel but serving to raise both the tool beam and the gauge wheel. In other words, the linkage is arranged so that first the gauge wheel is adjusted and then, when the gauge wheel and tool beam are raised together, is held against any further material movement relative to the tool beam.

More specifically, it is a feature of this invention to provide a hand lift which through a part of its movement serves to adjust the depth of operation while the remaining movement of the hand lift mechanism serves to raise the tool beam and the associated gauging means off the ground. An additional feature of this invention is the provision of a toggle linkage or the equivalent between the gauge means and tool beam and a lost motion connection between the adjusting means and the implement frame or other supporting means, whereby movement of the actuating mechanism or means through one range of movement can effect its function without affecting the function desired to be secured by additional movement of the same means.

These and other objects and advantages of the present invention will be apparent to those skilled in the art after a consideration of the following detailed description of the preferred structure, taken in conjunction with the accompanying drawings.

Figure 1:
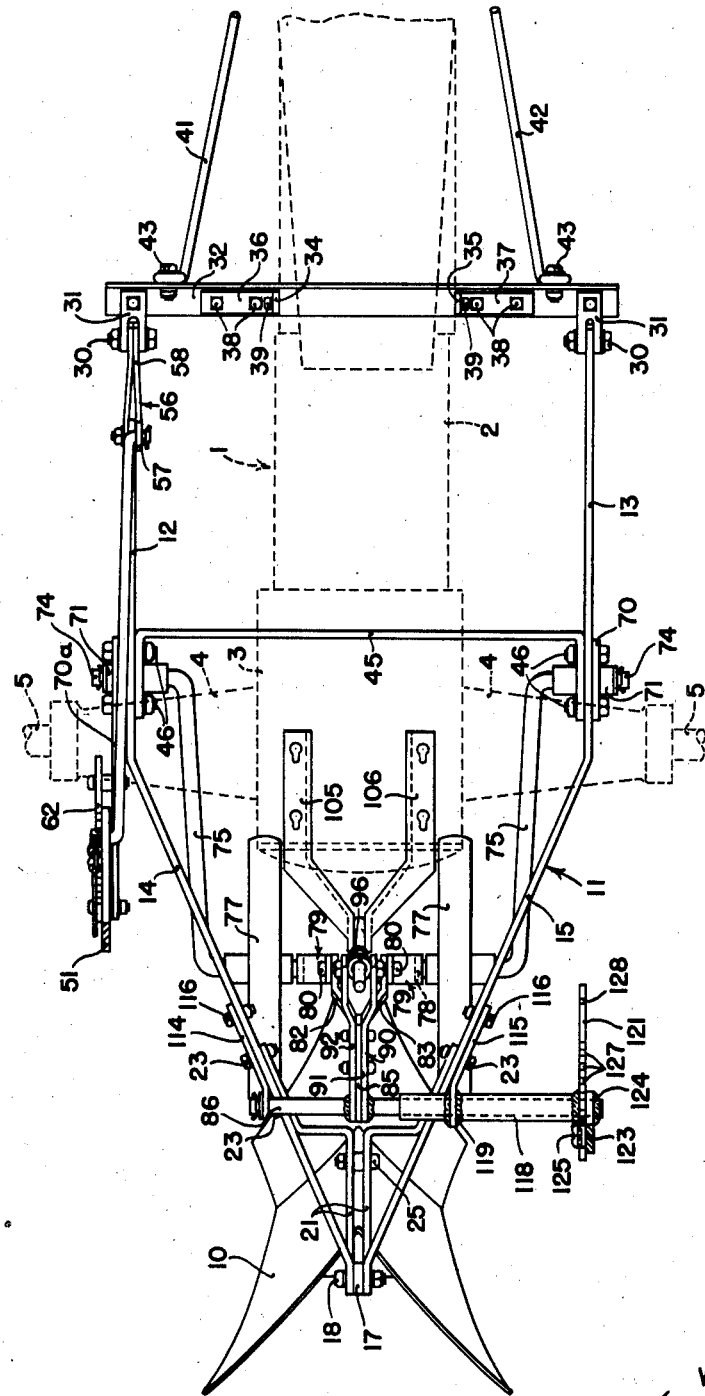
Figure 1 is a top view of a machine in which the principles of the present invention have been incorporated.
Figure 2:
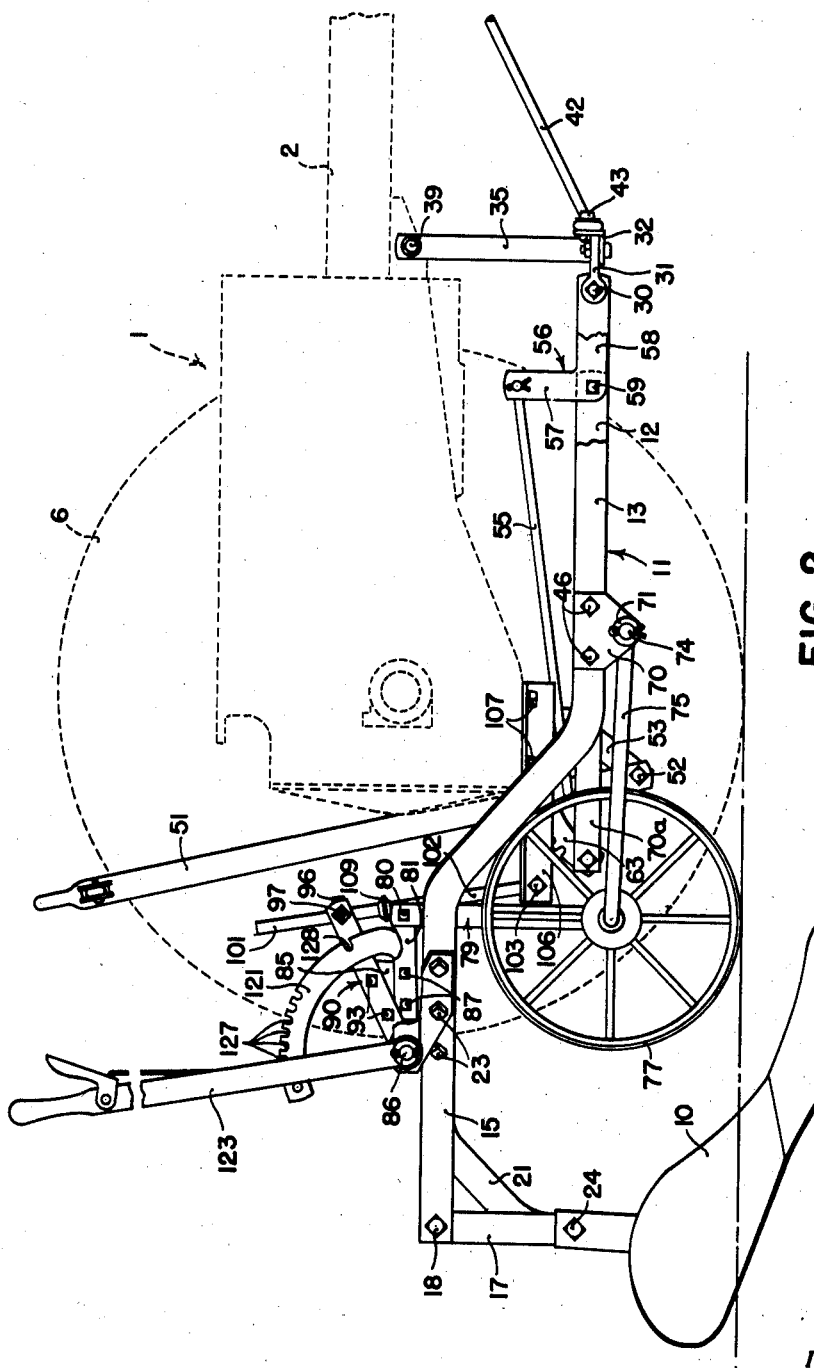
Figure 2 is a side view of the machine shown in Figure 1.

Referring now to the drawings, more particularly Figures 1 and 2, it will be seen that the present invention is embodied in a lister or middlebreaker of the single bottom type. The tractor to which the tool is attached is indicated in dotted lines by the reference numeral 1 and in general includes a frame 2, a transmission housing 3 and a rear axle housing 4 carrying axle shafts 5 on which rear wheels 6 are fixed. The lister or middlebreaker bottom is indicated at 10 and is carried at the rear end of a tool beam or bar structure indicated in its entirety by reference numeral 11. The latter includes a pair of generally longitudinally extending frame members 12 and 13 having rearwardly converging sections 14 and 15 to which the plow bottom standard 17 is bolted, as at 18. The rear end of the frame 11 is reenforced by horizontal Z-bar braces 21 (Figure 1) which are secured at their forward ends to the frame bars 12 and 13 by bolts 23 and which, at their rear ends, extend downwardly and are bolted at 24 to the lister or middlebreaker bottom 10. A bolt 25 connects the central portions of the brace bars 21 together, as best shown in Figure 1.

The frame bars 12 and 13 extend downwardly and then forwardly underneath the tractor 1, as best shown in Figure 2 and are connected by bolts 30 to a pair of laterally spaced swivels 31 at the outer ends of a transverse draft bar 32, preferably an angle member, which is secured to the tractor by a pair of vertical bars 34 and 35 the outer ends 36 and 37 of which extend laterally outwardly and are bolted as at 38 to the horizontal flange of the angle member 32. The upper ends of the bars 34, 35 are bolted, as at 39, to the tractor. Draft rods 41 and 42 are bolted, as at 43, to the vertical flange of the member 32 and extend forwardly to a point on the tractor adjacent the front end. At this point, the draft rods 41 and 42 may be secured directly to the tractor or, if desired, a cushion spring hitch (not shown) may be utilized, in which case the bolts 39 serve as pivots accommodating generally fore and aft swinging movement of the bars 34 and 35. The intermediate portion of the tool beam or frame structure 11 is reenforced by a cross bar 45 (Figure 1) which has its ends bent rearwardly and bolted, as at 46, to the frame bars 12 and 13.

The implement frame 11 may be leveled by means of a lever 51 which is pivoted at 52 to a bracket 53 secured to the left-hand frame bar 12. The lever 51 is connected by means of a link 55 to a bell crank 56, one arm 57 of which extends vertically and receives the forward end of the link 55 while the horizontal arm 58 thereof is pivotally connected by the bolt 30 to the swivel 31 (Figure 1). The intermediate portion of the bell crank 56 is connected by a pivot bolt 59 to the forward part of the left-hand tool bar 12. Suitable latching detent and sector mechanism, indicated in Figure 1 by the reference numeral 62, serves to secure the adjusting lever 51 in any position desired. Swinging the lever 51 fore and aft serves to shift the point 59 in one direction or the other relative to the hitch point at the forward end of the right-hand frame bar 13. Preferably, the sector, forming a part of the mechanism 62 referred to above, is extended downwardly to form the bracket 53, the sector being indicated by the reference numeral 63 in Figure 2.

According to the principles of the present invention, means is provided for gauging the depth of operation of the lister or middlebreaker bottom 10, and associated with the gauging means is suitable mechanism operative through a first range of movement for raising or lowering the tool bar or frame relative to the gauging means and then operative through another range of movement for lifting both the tool frame and the gauging means out of their ground engaging position.

To this end each of the frame bars 12 and 13 carries a bracket 70 which is secured to the associated frame bar by the bolts 46 which fasten one end of the cross bar 45 in place. One of these brackets is extended rearwardly, as at 70a, to serve as a support for the sector 63 and the leveling lever 51. Each bracket 70 carries a transversely disposed bearing sleeve 71, and each sleeve receives the outwardly bent end 74 of a crank axle 75, there being two such crank axles or links as shown in Figure 1. The rear end of each of the crank axles or links 75 is directed laterally inwardly and receives a gauge wheel 77 and the lower end 78 of a generally vertically disposed link 79. The upper end of each link 79 is connected by a pivot bolt 80 to an arm or link 81 (Figure 2) which consists of a pair of bars 82 and 83 (Figure 1) diverging outwardly at their forward ends and fixed at their rear ends to a plate 85 rigidly secured to a transverse rock shaft 86. The parts 75 thus serve as link means preventing longitudinal movement of the gauge means, and the position of the links determine the operating positions of the gauging means. Preferably, the bars 82 and 83 are bolted, as at 87, to the plate 85. The latter also carries or has securely fixed thereto a second arm 90 which is longer than the arm or link 81 and also includes a pair of bars 91 and 92 bolted, as at 93, Figure 2, to the plate 85 and flaring outwardly at their forward ends to receive a trunnion member 96 pivoted, as at 97, to the forward ends of the bars 91 and 92. The trunnion 96 is slidable on the upper end 101 of a strut 102, the lower end of which is pivoted by a bolt 103 to a pair of angles 105 and 106 (Figure 1) which are detachably connected to the lower portion of the rear axle housing by cap screws 107 or the like. The rear ends of the bracket angles 105 and 106 converge to receive the pivot bolt 103. The strut 102 is provided with a stop or flange 109 which cooperates with the slidable trunnion 96 as will be referred to below.

The transverse rock shaft 86 is supported on the rear converging sections 14 and 15 of the frame bars 12 and 13 by means of a pair of brackets 114 and 115, preferably bolted in place by the bolts 23 and additional bolts 116. The bracket 115, as best shown in Figure 1, has an elongated pipe or tubular member 118 secured thereto, as by welding 119 or the like, and a sector 121 is welded to the outer end of the rigid tubular member 118. A combination depth adjusting and lifting lever 123 is fixed, as by welding 124, to the outer end of the rock shaft 86 carrying the arms 81 and 90 as described above. The adjusting lever 123 carries detent mechanism 125 cooperating with the notches in the sector 121, whereby the lever 123 may be latched in different positions, the notches being indicated at 127 and providing for different depth adjustments by moving the frame 11 to different vertical positions relative to the gauge wheels 77. It will be clear from Figure 2 that moving the lever 123 forwardly along the notches 127, exerts a downward thrust through the link or arm 81 against the link 79, and hence raises the frame 11 relative to the gauge wheels 77.

Figure 3:
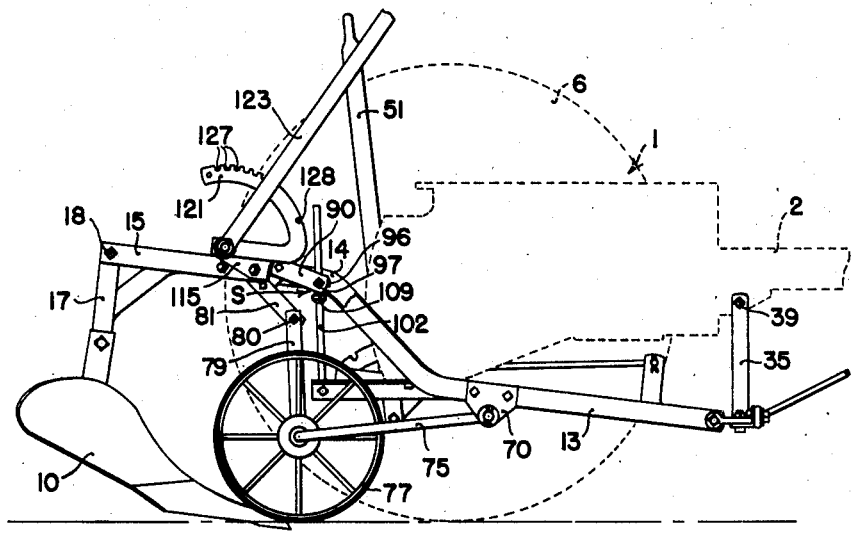
Figures 3 and 4 are views similar to Figure 2 but showing the parts in different positions.
Figure 4:
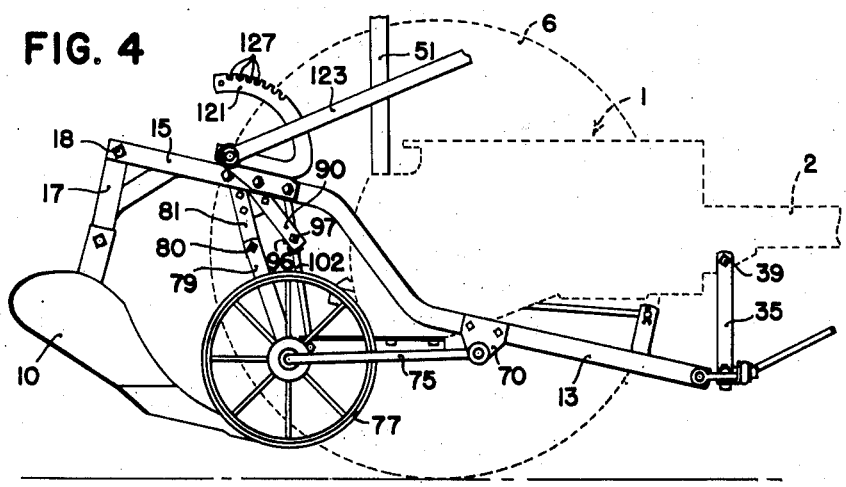

As best shown in Figure 3, when the lever 123 is moved to the forwardmost notch 127, the plow bottom 10 is in a position of shallowest adjustment, yet there is a sufficient space S between the slidable sleeve 96 and the stop 109 to permit the tool to be gauged by the ground. When the lever 123 is moved forward an additional amount the block 96 engages the stop flange 109 on the strut 102, and further movement of the lever then raises the tool into the position shown in Figure 4. During this movement, the members 81 and 79 approach a straight line relation, thereby serving as means in the nature of a toggle connection between the gauge wheels 77 and the tool frame 11, the links 79 and 81 approaching and passing into or through their straight line position, so that they are prevented from moving much farther downwardly relative to the frame structure 11, and hence as the frame 11 is raised into its transport position with the plow bottom 10 elevated above the ground, the gauge wheels 77 are also lifted out of engagement with the ground. However, the relations of the parts are such that the gauge wheels 77 lie at or just below the point of the plow bottom 10, whereby when the outfit moves over rough ground there is no danger of the plow point catching on the ground; instead the gauge wheels 77 would momentarily ride along the ground and prevent damage to the tool.

Thus, by virtue of the action of the arm 90 and the compression strut 102, both of which serve as toggle links, the implement may be raised in its entirety relative to the tractor so that for transport purposes the latter carries the entire weight of the implement, with both the plow bottom and the gauging means normally entirely out of contact with the ground. While I have shown the implement as supported from a tractor, which thereby serves as an implement frame for the tool beam structure 11, it will be understood that any other suitable supporting means may be employed. Further, it will also be seen that the hand lever 123 constitutes a part that is mounted on the tool beam structure and acts through a given range of movement for adjusting the latter relative to the gauging means and then through another range of movement for raising both the gauging means and the tool means relative to the tractor or other supporting frame means.

While I have shown and described above the preferred structure in which the principles of the present invention have been incorporated, it is to be understood that my invention is not to be limited to the particular means shown and described above, but that, in fact, different means may be employed in the practice of the broader aspects of my invention.

What I claim, therefore, and desire to secure by Letters Patent is:

1. An agricultural implement comprising tool means adapted to be raised and lowered, gauge means for said tool means, a lever having two arms, means connected with one arm of said lever and operated by the latter through one range of movement thereof for shifting said gauge means relative to said tool means for gauging the depth of operation of the latter, and means connected with the other arm of said lever and operated by said lever through another range of movement thereof for raising both said tool means and said gauge means out of ground engaging position.

2. In an agricultural machine, means serving as an implement frame unit, a tool beam unit operatively connected therewith for generally vertical movement, a member pivotally connected with said beam, link means connected at its forward end with one of said units, a gauge wheel mounted at the rear end of said forwardly extending link means, a second link means operatively connecting the outer end of said pivoted member with the gauge wheel end of said forwardly extending link, whereby pivoted movement of said pivoted member acts to adjust the position of said gauge wheel relative to said tool beam unit, a rockable member connected to swing said pivoted member and thereby adjust the position of said gauge wheel, and means actuated by said rockable member for raising both said tool beam unit and said gauge wheel off the ground, said last mentioned means including relatively movable parts extending between said implement frame unit and said tool beam unit, the relative movement therebetween providing for adjusting movement of said gauge wheel relative to said tool beam unit.

3. The combination with an agricultural implement having a frame, a tool beam, means movably connecting said beam with said frame, and gauging means movably connected with said beam, of means operative through a given range of movement and including two interconnected members, means connecting one with the gauging means for adjusting the position thereof relative to said beam, and means connecting the other member with the frame whereby upon further movement of said operative means the latter reacts against the frame for raising both said tool beam and said gauging means relative thereto out of contact with the ground.

4. In an agricultural implement adapted to be connected to a tractor, the combination of a generally longitudinally extending vertically swingable tool beam carrying ground engaging tool means, a gauge wheel adapted to traverse the surface of the ground for gauging the depth of operation of said tool means, a pair of members operatively connecting said gauge wheel with said tool beam, one of said members being pivoted to the tool beam and pivotal motion thereof acting through the other member to position the gauge wheel relative to said tool means, lost motion means operatively connected between said tool beam and the tractor, and means for shifting said pair of members to move said gauge wheel relative to said tool beam, said shifting means serving to take up the lost motion in said lost motion connection, further movement of said shifting means acting against the tractor and through said lost motion connection for raising said tool beam relative to the tractor, said members being disposed at such an angle relative to one another after the shifting means takes up said lost motion that the movement of said shifting means when raising the tool beam occasions no more than an immaterial amount of movement of the gauge wheel relative to the tool beam.

5. The combination set forth in claim 4, further characterized by said shifting means comprising a hand lever with which one of said members is rigidly connected so as to move bodily therewith, said lost motion means being connected with said one member and the tractor.

6. The combination with a tractor, of a tool beam pivotally connected therewith, a ground engaging gauge means movably connected with said tool beam, a swingable member, two parts movable therewith and arranged so that one part moves through a greater extent than the other, means connecting said other part with said gauge means, and lost motion means connecting said one part with said tractor, whereby the first movement of said swingable member effects depth adjustment and further movement of said swingable means reacts against the tractor for raising both the tool means and said gauge means out of ground engaging position.

7. An agricultural implement comprising means serving as an implement frame, a tool beam pivotally connected therewith, a gauge wheel movably connected with said tool beam, a hand lever pivotally mounted on said beam and having two arms, means operatively connecting one arm with said gauge wheel for moving the latter relative to said tool beam to adjust the operating position thereof, and means connecting the other arm with said implement frame for raising both said gauge wheel and said tool beam relative to said frame.

8. An agricultural implement comprising means serving as an implement frame, a tool beam pivotally connected therewith, a gauge wheel movably connected with said tool beam, a hand lever pivotally mounted on said beam and operatively connected with said gauge wheel for moving the latter relative to said tool beam to adjust the operating position thereof, a part pivoted to said implement frame and having a stop carried thereby, and an arm operatively connected with said hand lever and engageable with said stop for applying the reaction to the implement frame to raise said tool means and said gauge wheel, said arm and stop serving as limited lost motion means.

9. An agricultural implement comprising means serving as a frame, a tool beam pivotally connected therewith, a gauge wheel movably connected with said tool beam, a member pivotally connected with said tool beam and having means serving as a pair of arms, said arms being angularly displaced relative to each other whereby one arm moves in advance of the other when said member swings about its pivot, said one arm being connected with said gauge wheel whereby movement of said member through a given range operates to adjust the position of the gauge wheel relative to the tool beam, and means connected with said frame and having a lost motion connection with the other arm accommodating movement of said member to adjust the gauge wheel, further movement of said member reacting through said second arm after the lost motion has been taken up for raising both said tool beam and said gauge wheel.

10. An agricultural implement adapted to be attached to a tractor, comprising a tool beam adapted to be pivotally connected with the tractor, a lister bottom carried by said tool beam, the latter consisting of a pair of generally longitudinally disposed members pivotally connected at their forward ends with the tractor, a pair of gauge wheels disposed adjacent the lister bottom at each side thereof, link means extending generally longitudinally of the tractor and connecting each gauge wheel with the associated frame member to accommodate general vertical movement of the gauge wheel relative thereto and preventing generally longitudinal movement, a pair of links pivotally connected at their lower ends with said gauge wheels, a rock shaft carried by said frame members, an arm fixed to said rock shaft and connected with said links, whereby rocking movement of said rock shaft positions said gauge wheels relative to said frame members, a second arm fixed to said rock shaft, a bracket connected with the tractor, a strut pivotally connected at its lower end to said tractor carried bracket and having a stop adjacent its upper end, a sleeve member slidable on the upper portion of said strut above said stop and pivotally connected with said second arm, and means for rocking said rock shaft, initial movement thereof acting through said first arm and said pair of links for raising said tool beam relative to the gauge wheels, and subsequent movement of said rock shaft causing said second arm to react against the tractor through said strut and the stop thereon for raising both said tool beam and said gauge wheels out of ground engaging position.

11. An agricultural machine comprising means serving as a supporting frame, tool means adapted to be raised and lowered relative to said frame means into and out of a transport position, means for gauging the depth of operation of said tool means, a member movable through one range for adjusting said gauging means, and connections whereby said member is movable through another range for raising said tool means into transport position, said member including two arms movable in substantially fixed relation, one arm being connected to adjust said gauging means and the other arm being operative to raise said tool means into transport position.

12. An agricultural machine, means serving as an implement frame unit, a tool beam unit operatively connected therewith for generally vertical movement, tool means connected with said beam unit, a member movably connected with one of said units, gauge means movable with respect to said beam unit for gauging the depth of operation of said tool means, an arm movable by said member, a link connecting said arm and tool unit and movable substantially into straight line relation with respect to said arm in one position of said movable member, and means whereby movement of said movable member raises said tool means when said arm and link are in said straight line relation.

13. The combination with an agricultural implement having a frame, a tool beam, means movably connecting said beam with said frame, and gauging means operable to control the operating depth of said tool means, of means operative through a given range of movement and including two interconnected members, means connecting one with the gauging means for adjusting the position thereof relative to said beam, and means connecting the other member with the frame whereby upon further movement of said operative means the latter reacts against the frame for raising both said tool beam and said gauging means relative thereto out of contact with the ground.

14. An agricultural implement comprising means serving as a frame, tool means shiftably connected therewith, lever means having two spaced apart portions, one portion being connected with said tool means whereby movement of said lever means through one range serves to adjust the operating position of said tool means, and means connecting the other portion of said lever means with said frame means so as to react against the latter, when said lever means moves through another range of movement, and raise said tool means out of contact with the ground.

15. In an agricultural implement, means serving as an implement frame, tool means, means pivotally connecting said tool means with said frame means, gauge means movably connected with said tool means, movable means operative through two ranges, means connecting said gauge means with said movable means whereby movement of the latter through one range serves to shift said gauge means relative to said tool means for determining the depth of operation of the latter, and means operative by movement of said movable means through its other range of movement for raising both said tool and gauge means relative to said frame means out of contact with the ground, the means that connects the gauge means with the movable means including means whereby said gauge means is held adjacent said tool means when the latter and said gauge means are raised out of contact with the ground.

16. An agricultural implement comprising tool means adapted to be raised and lowered, gauge means for said tool means, a lever having two arms, means connected with one arm of said lever and operated by the latter through one range of movement thereof for shifting said gauge means relative to said tool means for gauging the operating position of the latter, and means connected with the other arm of said lever and operated by said lever through another range of movement thereof for raising both said tool means and said gauge means out of operating position.

17. In an agricultural implement adapted to be connected to a tractor, the combination of a generally longitudinally extending vertically swingable tool beam carrying ground engaging tool means, a gauge wheel adapted to traverse the surface of the ground for gauging the depth of operation of said tool means, a pair of members operatively connecting said gauge wheel with said tool beam, one of said members being pivoted to the tool beam and pivotal motion thereof acting through the other member to position the gauge wheel relative to said tool means, lost motion means operatively connected between said tool beam and the tractor, and means for shifting said pair of members to move said gauge wheel relative to said tool beam, said shifting means serving to take up the lost motion in said lost motion connection, further movement of said shifting means acting against the tractor and through said lost motion connection for raising said tool beam relative to the tractor.

18. In an agricultural implement adapted to be connected to a tractor, the combination of a generally longitudinally extending vertically swingable tool beam carrying ground engaging tool means, a gauge wheel adapted to traverse the surface of the ground for gauging the depth of operation of said tool means, a pair of members operatively connecting said gauge wheel with said tool beam, one of said members being pivoted to the tool beam and pivotal motion thereof acting through the other member to position the gauge wheel relative to said tool means, lost motion means operatively connected between said tool beam and the tractor and accommodating relative movement between the tool beam and the tractor, and mechanism for shifting said one member, so as to move said gauge wheel relative to said tool beam, and taking up the lost motion in said lost motion connection and then acting therethrough for raising the tool beam relative to the tractor.

19. In an agricultural implement adapted to be connected to a tractor, the combination of a generally longitudinally extending vertically swingable tool beam carrying ground engaging tool means, a gauge wheel adapted to traverse the surface of the ground for gauging the depth of operation of said tool means, a pair of members operatively connecting said gauge wheel with said tool beam, one of said members being pivoted to the tool beam and pivotal motion thereof acting through the other member to position the gauge wheel relative to said tool means, lost motion means operatively connected between said tool beam and the tractor and accommodating movement of the tool beam resulting from movement of said one member when disposing the gauge wheel in different operating positions, and means acting through said lost motion means for raising the tool beam relative to the tractor.

20. An agricultural implement comprising tool means adapted to be raised and lowered, gauge means for said tool means, means including a pair of pivoted parts for moving said gauge means to change the operating position of said gauge means, said pivoted parts movable substantially into a straight line position when the tool means approaches one of its end operating positions, and means operated by movement of one of said parts when the latter approach said straight line position for raising said tool means into an inoperative position.

21. In an agricultural implement adapted to be connected to a tractor, the combination of a generally longitudinally extending vertically swingable tool beam carrying ground engaging tool means, a gauge wheel adapted to traverse the surface of the ground for gauging the depth of operation of said tool means, means for moving said gauge wheel relative to said tool means for adjusting the depth of operation thereof, an arm movable with said means, a strut pivotally connected at its lower end to said tractor and having a stop adjacent its upper end, a sleeve member slidable on the upper portion of said strut above said stop, and means connecting said arm with said sleeve whereby movement of said gauge wheel moving means causes said arm to react against the tractor through said strut and the stop thereon for raising both said tool beam and said gauge wheel out of ground engaging position.

22. An agricultural implement adapted to be attached to a tractor, comprising a tool beam adapted to be pivotally connected with the tractor, a lister bottom carried by said tool beam, the latter consisting of a pair of generally longitudinally disposed beam members pivotally connected at their forward ends with the tractor, a pair of gauge wheels disposed adjacent the lister bottom at each side thereof, link means extending generally longitudinally of the tractor and connecting each gauge wheel with the associated beam member to accommodate general vertical movement of the gauge wheel relative thereto and preventing generally longitudinal movement, a pair of links pivotally connected at their lower ends with said gauge wheels, a rockshaft carried by said beam members, and an arm fixed to said rockshaft and connected with said links, whereby rocking movement of said rockshaft positions said gauge wheels relative to said beam members.

23. An agricultural implement adapted to be attached to a tractor, comprising a tool beam adapted to be pivotally connected with the tractor, a lister bottom carried by said tool beam, the latter consisting of a pair of generally longitudinally disposed members pivotally connected at their forward ends with the tractor, a pair of gauge wheels disposed adjacent the lister bottom at each side thereof, means movably connecting the gauge wheels with the beam members, respectively, and a rockshaft carried by said frame members and connected with both of said gauge wheels for raising and lowering the latter.

24. An agricultural machine comprising means serving as a supporting frame, tool means adapted to be raised and lowered relative to said frame means into and out of a transport position, means for gauging the depth of operation of said tool means, and a member movable through one range for adjusting said gauging means, and movable through another range for raising both the said tool means and the gauging means into transport position, connections whereby movement of said movable member through said other range raises both said tool means and the gauging means, said member including means serving as two arms of unequal length, the shorter being connected to adjust said gauging means and the longer operative to raise both the tool means and the gauging means.

WALTER H. SILVER.